United States Patent [19]

Braschel et al.

[11] Patent Number: 4,504,911
[45] Date of Patent: Mar. 12, 1985

[54] VEHICLE WHEEL BRAKE ANTI-LOCK SYSTEM WITH LOW SPEED CONTROL

[75] Inventors: Volker Braschel, Heilbronn; Wolf-Dieter Jonner, Beilstein; Heinz Leiber, Oberriexingen, all of Fed. Rep. of Germany

[73] Assignee: Robert Bosch GmbH, Stuttghart, Fed. Rep. of Germany

[21] Appl. No.: 389,588

[22] Filed: Jun. 18, 1982

[30] Foreign Application Priority Data

Jul. 15, 1981 [DE] Fed. Rep. of Germany ....... 3127902

[51] Int. Cl.³ .............................................. B60T 8/02
[52] U.S. Cl. ..................................... 364/426; 303/96; 303/109
[58] Field of Search .................... 364/426; 188/181 C; 303/91, 93, 94–96, 100, 102, 103, 104, 106, 109

[56] References Cited

U.S. PATENT DOCUMENTS 3,993,363 11/1976 Skoyles et al. ...................... 303/102
4,078,845  3/1978 Amberg et al. ..................... 303/106
4,180,223 12/1979 Amberg ............................... 303/93
4,285,042  8/1981 Ohmori et al. ...................... 364/426
4,374,421  2/1983 Leiber ................................. 364/426
4,395,761  7/1983 Sato et al. ........................... 303/106
4,420,191 12/1983 Arikawa et al. ..................... 364/426
4,435,768  3/1984 Arikawa .............................. 364/426
4,446,522  5/1984 Sato et al. ........................... 303/106

Primary Examiner—Gary Chin
Attorney, Agent, or Firm—Frishauf, Holtz, Goodman & Woodward

[57] ABSTRACT

To extend the range of automatic control of a brake anti-lock system, wheel speeds ($V_{R1}$–$V_{R4}$) are processed and changed into control signals (12, 15) controlling braking effort of the vehicle. A first predetermined vehicle reference speed ($V_{REF}$) is provided, and compared with a computed or actual vehicle speed. If the computed or actual vehicle speed drops below the first reference level ($V_{REF1}$), a transfer switch (25) changes over control of the braking pressure control unit (22) from the standard control unit (23) to an auxiliary or additional branch (26) which initially maintains braking pressure, but drops braking pressure if the wheel speed of an individual wheel drops below a minimum level ($V_{min}$) and the actual vehicle speed is above a second reference level ($V_{REF2}$), which second reference level is below the first reference level ($V_{REF1}$). The second reference level ($V_{REF2}$) corresponds to a speed in excess of the minimum ($V_{min}$).

7 Claims, 2 Drawing Figures

VEHICLE WHEEL BRAKE ANTI-LOCK SYSTEM WITH LOW SPEED CONTROL

Reference to related publications: "Bosch-Technische Berichte" ("Bosch-Technical Reports"), vol. 7, issue 2 (1980); German Patent Disclosure Document DE-OS No. 22 12 584.

The present invention relates to a wheel anti-lock system, and more particularly to a system to prevent continued automatic braking control even if the actual vehicle speed is extremely low and normal function by the vehicle brake anti-lock system has ceased to control braking.

BACKGROUND

Various types of wheel brake control systems for vehicles are known. In most such systems, sensors are attached to the wheels of the vehicles which sense the speed of the wheel as well as the speed of the vehicle. Generally, a central control unit is provided which generates control commands which, in turn, adjust the braking pressure applied to the wheel brakes of the vehicles if predetermined driving or operating conditions obtain. Generally, control is effected in dependence on certain limiting values related to wheel acceleration or deceleration, respectively, and slippage between the wheel and the road or other support surface therefor. The publication "Bosch-Technische Berichte" ("Bosch-Technical Reports") describes such a system.

If the vehicle operates at extremely low speed, it is difficult to obtain suitable signals from the sensors coupled to the wheels, and particularly to obtain signals which can be evaluated with respect to slippage, acceleration or deceleration of the wheel. It has, therefore, been proposed to suppress automatic braking operation when the vehicle speed drops below a predetermined level. This level is related to the signals which can be processed by the anti-lock system—see, for example, German Patent Disclosure Document DE-OS No. 22 12 584. This system, thus, does not permit automatic braking at low vehicle speeds.

THE INVENTION

It is an object to provide for automatic braking of vehicle wheels even if the speed of the vehicle or of the wheels is so low that useful signals can no longer be obtained from sensors coupled to the wheels. Such a system is particularly useful to permit controlled braking if the vehicle is operating downhill on a slippery surface, for example downhill on a snow or ice-coated road.

Briefly, a predetermined vehicle speed is recognized at which time the normal wheel anti-lock system is no longer operable, and hence command signals therefrom are interrupted. Upon recognition of this speed, a separate or additional control channel is enabled which provides predetermined braking functions independent of wheel speed in this manner: Initially, braking effort is maintained and, subsequent thereto, the braking effort is reduced. This operation is carried out if (a) the sensed actual speed $V_R$ of a wheel is less than a predetermined minimum speed; and (b) the vehicle speed is above a second predetermined limit ($V_{REF2}$), which second predetermined limit is less than a first predetermined limit speed ($V_{REF1}$), at which the normal anti-lock system ceases to operate.

The system has the advantage that low speeds of the vehicle will not prevent automatic braking operation, so that extended locking of the vehicle wheels is prevented. This is particularly advantageous if a vehicle is operated on a smooth, for example snowy or icy road which goes downhill. The vehicle may already be operating at low speed. With the system it is still possible to so control the brakes that the vehicle is effectively braked to the best possible extent under the then pertaining driving conditions.

In accordance with a preferred embodiment of the invention, transfer to the auxiliary or additional control channel or control path at low vehicle speeds is carried out only when all wheels operate below a predetermined level. This insures that undesired response upon starting with a slippery road surface is prevented.

In accordance with another preferred embodiment of the invention, the rear wheels are controlled by the auxiliary or additional braking system only if the front wheels are already so controlled. This insures that, if the vehicle turns a tight corner, for example if the vehicle is to be reversed on a narrow road, erroneous response of the control system will not occur. Due to the geometry of the wheel positions, upon turning of the vehicle over a sharp turning radius, the rear inner wheel—with respect to the turning radius—will be excessively low; simultaneously, the outer front wheel, however, will simulate a relatively high vehicle speed. The system is so arranged that spurious response under such conditions is prevented.

DRAWINGS

Figure 1:
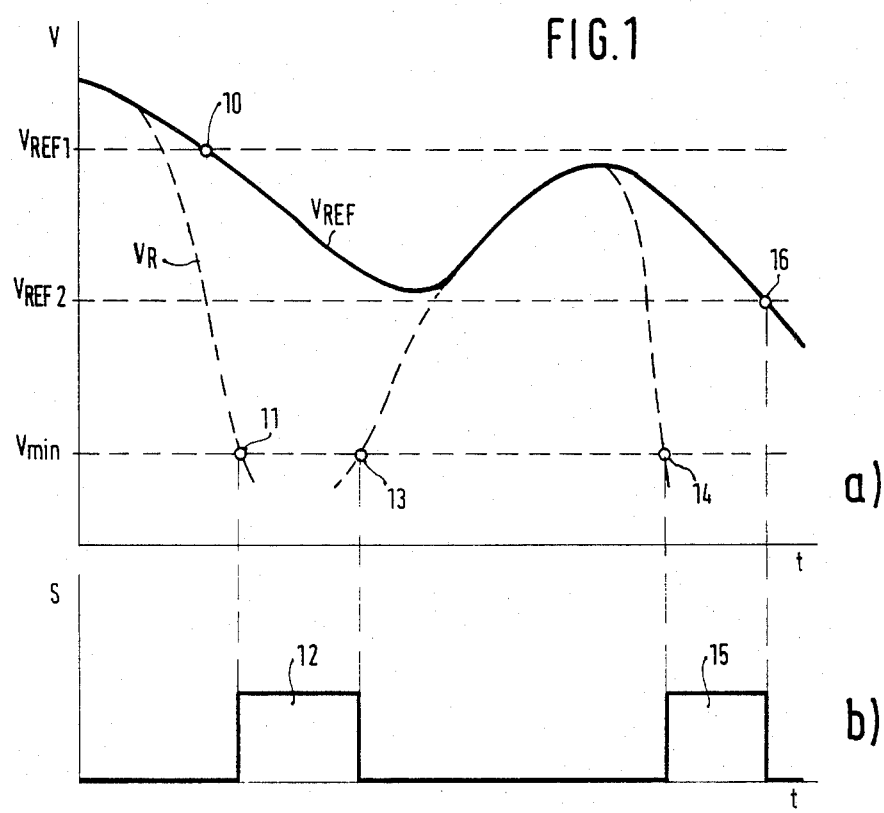
FIG. 1 is a series of graphs illustrating the operation of the system.

FIG. 1, in graph a, illustrates the relationships of speeds (abscissa) with respect to time, of wheel speed $V_R$, and reference speed $V_{REF}$, and also showing the levels of reference speeds $V_{REF1}$, $V_{REF2}$, and $V_{min}$. The graph b of FIG. 1, in alignment with the timing graph a shows the amplitude course—with respect to time—of a control signal S to decrease braking pressure.

The reference speed $V_{REF}$ is a parameter which is related to actual vehicle speed. It is usually obtained by processing a speed signal derived from a wheel which may be driven or not, and, during braking, is obtained by linear extrapolation, from a predetermined instant of time, with a predetermined slope with respect to time.

Customary wheel anti-lock systems, as described in the literature, provide control signals which control braking pressure of the hydraulic braking lines of a vehicle or, in other words, control the braking effort in dependence on vehicle or wheel operating parameters such as wheel acceleration/deceleration, as well as wheel slippage. Usually, these parameters are related to limiting or threshold levels. The system in accordance with the present invention utilizes such an anti-lock system, which controls braking effort in a direction to reduce braking effort or hydraulic braking pressure if the reference speed $V_{REF}$ drops below a predetermined vehicle speed reference level $V_{REF1}$. Referring to FIG. 1, this occurs at instant 10. Starting at instant 10, braking pressure is first held constant. Due to continuous braking, the wheel speed $V_R$ will drop rapidly—see graph a, broken line. At point 11, the wheel speed $V_R$ passes below a predetermined minimum e.g. wheel speed value $V_{min}$. Upon conjunction of the two conditions:

(a) reference speed $V_{REF}$ less than first predetermined limit $V_{REF1}$; and (b) wheel speed $V_R$ less than predetermined wheel speed $V_{min}$ braking pressure is decreased, as seen in the diagram 12 in graph b of FIG. 1. When the wheel speed $V_R$ at point 13 exceeds the predetermined value ($V_{min}$), lowering of braking pressure is stopped. The subsequent conditions of braking effort, that is, maintenance of braking pressure, and increase of braking effort—increase of braking pressure in a hydraulic or pneumatic system—is then carried out in known manner.

In accordance with the invention, a further condition is provided for lowering braking pressure which relates the reference speed $V_{REF}$ to a second predetermined limit $V_{REF2}$. The conditions are that the reference speed $V_{REF}$ is above a reference level $V_{REF2}$, in which $V_{REF2}$ is less than $V_{REF1}$, but greater than $V_{min}$.

After the wheel has accelerated, starting at point 13, the wheel speed in the next braking cycle again decreases and at point 14 drops below the minimum value $V_{min}$. As seen in graph b, diagram portion 15, the braking pressure is again lowered. Lowering the braking pressure is stopped when, in the second phase, the reference speed $V_{REF}$ at time 16 passes below the second predetermined limit $V_{REF2}$.

The diagrams of FIG. 1 clearly show that, at low vehicle speeds, only speed signals are used to control braking effort or braking pressure. Conversion into acceleration/delay, or slipping signals is not done. Thus, it is possible to drop the turn-on level of the control unit, that is, beginning of braking, and the level at which the control unit no longer provides suitable output signals, that is, the termination of the effectiveness of the control signal—with respect to vehicle speed. It must be remembered here that "vehicle speed" may be a fictitious value, related to the speed of the vehicle, and may be considered analogous to the speed of a wheel turning without slip on a surface, thus being representative of true vehicle speed. As noted, under driving conditions on slippery surfaces, this may be a computed or extrapolated value derived, in known manner, from wheel speed data of wheels which do not have perfect adhesion with the road surface.

Figure 2:
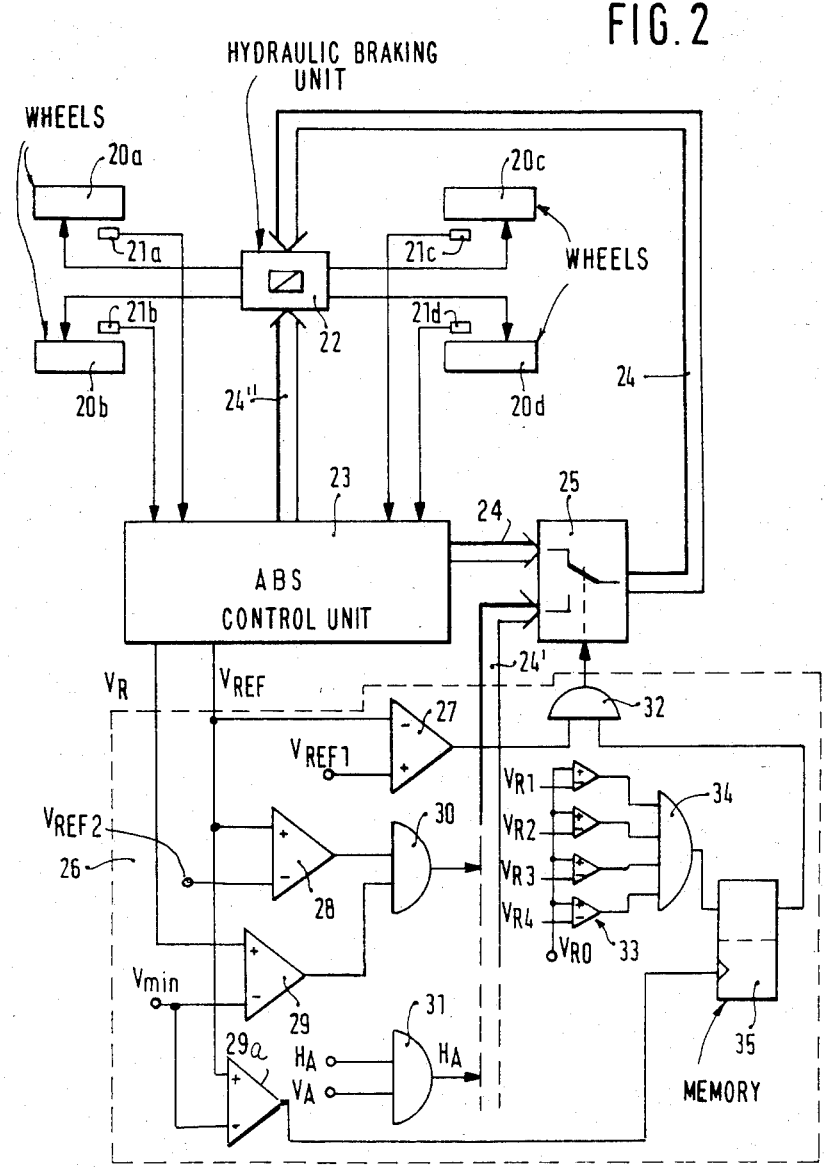
FIG. 2 is a schematic block diagram of the wheel anti-lock system.

The system to carry out the method of operation in accordance with the present invention is shown in FIG. 2. Four wheels of a vehicle, 20a, 20b, 20c, 20d, each have a wheel rotation sensor 21a–21d associated therewith. The braking pressure applied, for example, to hydraulic brakes, is set by a hydraulic braking unit 22. The hydraulic braking unit 22 is controlled from a control unit 23, forming the control element of the automatic braking system (ABS). This portion of the system is in accordance with well known arrangements. The hydraulic braking unit 22 is controlled from the control unit 23 by applying signals derived from the sensors 21a–21d to the control unit, processing the signals therein, and providing output signals over a line 24'' to the hydraulic braking unit 22. The signals processed by the control unit 23 provide, internally, wheel speed signals $V_R$ and the reference or vehicle speed $V_{REF}$.

In accordance with the present invention, a change-over switch 25 is located in a data line 24 extending from the control unit 23 to the braking unit 22. The transfer switch 25 permits transferring data being applied to the control unit 22, selectively, either from the control unit 23 of from an additional or auxiliary control branch 26.

The auxiliary or additional control branch 26 has a plurality of comparators. A first comparator 27 has applied thereto a signal corresponding to the reference speed $V_{REF}$ to one input and, at the other input, a first predetermined reference level corresponding to a first predetermined vehicle speed $V_{REF1}$.

A second comparator 28 also has the reference speed $V_{REF}$ applied thereto, the other input receiving a signal which corresponds to a second predetermined reference level $V_{REF2}$. A third comparator 29 is provided which receives a signal $V_R$ corresponding to speed of one of the wheels, and a minimum wheel speed signal $V_{min}$ for comparison purposes. Comparator 29 is illustrated for only one wheel. Of course, the control branch 26 has the same number of comparators 29 as the number of controlled wheels of the vehicle. The outputs of the comparators 28, 29 are applied to an AND-gate 30. For a four-wheel vehicle, four AND-gates and four comparators 29 would be used, connected to bus 24'. The output from AND-gate 30 is applied to a data line 24' which leads to the transfer switch 25. A further AND-gate 31 is provided, likewise connected to the data bus 24', which has input signals $H_A$ and $V_A$ applied thereto, which are associated with the rear axle HA, or the forward axle VA, respectively, and provide signals which indicate whether the signals being processed in the auxiliary branch 26 are derived from forward or rear wheels, respectively. The output of comparator 27 is applied to an input of and AND-gate 32, the other input of which is connected to the output of a memory stage 35 which can be dynamically reset by a comparator 29a associated with the reference speed $V_{REF}$ and the minimum wheel speed signal. The setting input is connected to the output of an AND-gate 34. The input of AND-gate 34 is connected to a group 33 of four comparators, which have the respective wheel speeds $V_{R1}$, $V_{R2}$, $V_{R3}$, $V_{R4}$ of the wheels 20a to 20d applied thereto, for comparison with a threshold level $V_{Ro}$. The output signal of the AND-gate 32 is used to control the switching position of transfer switch 25, that is, to control the flow of data either from unit 23 directly to the hydraulic braking unit 22, or from the auxiliary control unit 26, respectively.

Operation, with reference again to FIG. 1: Let it first be assumed that the operating and braking sequences and cycles are in normal condition, that is, under reasonable good adhesion between wheels and road surface, and reasonable speed. Switch 25 will be in the position shown in full line in the drawing. Signals from sensors 21a to 21d are processed in the control unit 23 and applied via data bus 24, switch 25, the second branch 24 of the data bus to the hydraulic braking unit 22 in order to adjust the braking pressure at the respective brakes in accordance with the control signals derived from control unit 23. Additionally, the reference speed $V_{REF}$ is—as above described—computed and derived, corresponding, at least roughly, to or simulating a predetermined vehicle speed. Comparator 27 compares this reference speed $V_{REF}$ with a predetermined vehicle or reference speed $V_{REF1}$. If the computed processed or actual vehicle reference speed $V_{REF}$ drops below the predetermined first reference level $V_{REF1}$, an output will be derived from comparator 27 which enables one input of AND-gate 32. The other input of the AND-gate 32 will be enabled when all of the wheel speeds of the wheels $V_{R1}$ to $V_{R4}$ are above the threshold level $V_{Ro}$. The memory 35 is provided to prevent dropout of the AND-gate if the individual wheel speeds $V_{R1}$ to $V_{R4}$ change during control by the auxiliary or additional control branch 26, that is, to disable continued evaluation of the individual wheel speeds. The memory 35 will remain set after response of the AND-gate 34 until the reference speed $V_{REF}$ drops below the minimum speed $V_{min}$, causing a comparator 29 to respond and hence resetting of memory 35.

If anyone of the wheel speeds $V_R$ drops below the minimum wheel speed $V_{min}$ and, further, comparator 27 has determined that the reference vehicle speed $V_{REF}$ is below the first predetermined level $V_{REF1}$, AND-gate 32 will be enabled, and a switch-over signal will be applied to the transfer switch 25, which will change over from the solid-line position to the position shown open in the drawing. Associating the individual wheel speeds $V_{R1}$ to $V_{R4}$ in gate 32 through gate 34 has the purpose to insure that, upon starting of the vehicle, particularly on a slippery surface, the control of the control branch 26 will not become operative.

Upon transfer of the switch 25 into the lower switching position, hydraulic braking unit 22 will receive command signals from the data bus 24' and the right-hand portion of bus 24, that is, commands from the respective AND-gates 30, or multiple AND-gates corresponding to the other vehicle wheels if separate AND-gates 30 are provided for each one of the wheels associated with respective comparators 29. Initially, braking pressure is held constant or even by the data line 24'', connected directly from the control unit 23 to the hydraulic braking unit 22, and not switched by switch 25. An output signal from AND-gate 30, however, means that the braking pressure in the associated wheel, that is, in the wheel associated with the respective AND-gate 30, is to be dropped. This will be the case when the reference speed $V_{REF}$ is higher than the second predetermined reference level $V_{REF2}$, as determined by comparator 28, and, further, the associated wheel speed $V_R$ is less than the minimum wheel speed level $V_{min}$, as determined by comparator 29—see FIG. 1; and, when additionally the reference speed $V_{REF}$ is below the higher or first predetermined reference level $V_{REF1}$, causing interruption of the data line 24 from unit 23 to braking unit 22 in the first place and transfer, instead, of data from the auxiliary branch 26.

Pressure maintenance and pressure build-up functions and operations are continued in accordance with well known operating modes.

AND-gate 31 controls the wheels of the rear axle $H_A$ in this manner: Control commands for the wheels of the rear axle $H_A$ are transferred only if, upon initiation of control by the branch 26, the wheels of the front axle $V_A$ are already under operating control of the unit 26. This provision prevents undesired response of the control system upon making a tight radius turn, for example upon reversing of the vehicle, since, in that case, due to the vehicle geometry, the wheel speed $V_R$ of the rear wheel at the inner curve radius may well be less than the minimum value $V_{min}$ while, at the same time, the reference speed $V_{REF}$, which is influenced by the front wheel at the outer turning radius, may well be substantially higher than the minimum value $V_{min}$.

Various changes and modifications may be made within the scope of the inventive concept.

We claim:

1. Vehicle wheel anti-lock system having
  a plurality of sensors (21a–21d) for sensing speed of the wheels (20a–20d) of the vehicle;
  a braking effort control unit (22) for controlling braking pressure being applied to the vehicle wheels;
  a system control unit (23) connected to and controlling the brake effort control unit (22), said brake effort control unit having applied thereto sensing signals applied from said plurality of sensors and evaluating wheel acceleration/deceleration, wheel speed, and generating a signal ($V_{REF}$) representative of a reference vehicle speed,
  and comprising, in accordance with the invention,
  an additional control channel (26) for providing predetermined braking functions including
  means for, initially, maintaining braking effort and, subsequent thereto, lowering the braking effort if
    (a) the sensed actual speed ($V_R$) of a wheel is less than a predetermined wheel speed level ($V_{min}$), and
    (b) the reference vehicle speed ($V_{REF}$) is above a second predetermined level ($V_{REF2}$), which second predetermined level is less than said first predetermined level ($V_{REF1}$);
  and wherein said system control unit further includes switching means (25) for transferring command of the braking function of said additional control channel to the brake effort control unit (22) when the reference vehicle speed ($V_{REF}$) falls below said first predetermined level ($V_{REF1}$).

2. System according to claim 1, further including wheel speed comparator means (33) for comparing individual wheel speeds ($V_{R1}$–$V_{R4}$) with a minimum wheel speed threshold value ($V_{Ro}$);
  and logic means (32) coupled to and controlling said switching means (25) to enable transfer of said additional control channel (26) only if the wheel speeds from all wheels exceed the minimum threshold wheel speed value ($V_{Ro}$).

3. System according to claim 1, further including axle logic means (31) for sensing if the wheels associated with the front axle are operating at a speed below said wheel predetermined wheel speed level ($V_{min}$), and controlling operation of said switching means for the rear wheels only if the front wheels are operating below said predetermined wheel speed level ($V_{min}$).

4. Method of controlling a vehicle wheel anti-lock system having
  a plurality of sensors (21a–21d) for sensing speed of the wheels (20a–20d) of the vehicle;
  a brake effort control unit (22) for controlling braking pressure being applied to the vehicle wheels;
  a system control unit (23) connected to and controlling the brake effort control unit (22), and evaluating wheel acceleration/deceleration, wheel speed, and generating a signal representative of a vehicle reference speed ($V_{REF}$), including the steps of
  interrupting command of braking control by said system control unit (23) and changing-over to an additional control channel (26) when the reference vehicle speed ($V_{REF}$) passes below a first predetermined level ($V_{REF1}$);
  comparing an individual wheel speed ($V_R$) with a predetermined wheel speed level ($V_{min}$);
  comparing the vehicle reference speed ($V_{REF}$) with a second predetermined level ($V_{REF2}$), which second level is less than said first predetermined level;
  lowering braking effort when
    (a) the vehicle reference speed ($V_{REF}$) is below the first predetermined level ($V_{REF1}$), and (b) the respective wheel speed ($V_R$) has dropped below the predetermined wheel speed level ($V_{min}$), and while the reference vehicle speed ($V_{REF}$) is still above the second reference level ($V_{REF2}$);

continuing to lower braking effort until the wheel speed ($V_R$) rises above the predetermined wheel speed level ($V_{min}$);

and then maintaining braking effort after said wheel speed ($V_R$) has risen above the predetermined wheel speed level.

5. Method according to claim 4, further including the step of maintaining braking effort if the reference vehicle speed ($V_{REF}$) drops below the second predetermined reference level ($V_{REF2}$) regardless of speed of operation of any one of the wheels.

6. Method according to claim 4, further including the step of comparing the speeds ($V_{R1}$–$V_{R4}$) of all the wheels with a predetermned wheel speed threshold value ($V_{Ro}$);

and controlling by lowering the braking effort only if all wheel speeds ($V_{R1}$–$V_{R4}$) exceed said predetermined wheel speed threshold value.

7. Method according to claim 4, including the step of sensing the speed of the wheels on the front axle of the vehicle;

determining if the so-sensed speed is below said predetermined wheel speed level ($V_{min}$);

and controlling by lowering the braking effort only if the front wheels are already operating below said predetermined wheel speed level ($V_{min}$).

* * * * *